United States Patent [19]

Burkus, II et al.

[11] Patent Number: 5,688,888
[45] Date of Patent: Nov. 18, 1997

[54] PERALKYLATED PHOSPHAZENE BASE-CATALYZED SILANOL CONDENSATION METHOD

[75] Inventors: Frank Steven Burkus, II, Clifton Park, N.Y.; Krzysztof Matyjaszewski, Pittsburgh, Pa.; Slawomir Rubinsztajn, Schenectady, N.Y.

[73] Assignee: General Electric Company, Schenectady, N.Y.

[21] Appl. No.: 629,115

[22] Filed: Apr. 8, 1996

[51] Int. Cl.$^6$ .................................................. C08G 77/06
[52] U.S. Cl. .................. 528/22; 528/21; 528/23; 528/398; 528/399; 528/422; 556/453; 556/456; 556/462; 558/93; 502/162; 502/167; 502/200
[58] Field of Search ...................... 528/21, 22, 23, 528/398, 399, 422; 556/453, 456, 462; 558/93; 502/162, 167, 200

[56] References Cited

U.S. PATENT DOCUMENTS

| | | | |
|---|---|---|---|
| 5,380,902 | 1/1995 | Hager et al. | 556/462 |
| 5,403,909 | 4/1995 | Rubinsztajn | 528/20 |
| 5,408,025 | 4/1995 | Thompson et al. | 528/12 |
| 5,420,221 | 5/1995 | Razzano et al. | 528/16 |
| 5,424,385 | 6/1995 | Hager et al. | 528/28 |

*Primary Examiner*—James J. Seidleck
*Assistant Examiner*—Duc Truong
*Attorney, Agent, or Firm*—William H. Pittman

[57] ABSTRACT

Organopolysiloxane oils and gums are produced by the condensation of silanol-terminated organosiloxane in the presence of an effective amount of a peralkylated phosphazene base as a catalyst and at reduced pressure.

7 Claims, No Drawings

PERALKYLATED PHOSPHAZENE BASE-CATALYZED SILANOL CONDENSATION METHOD

BACKGROUND OF THE INVENTION

The present invention relates to the polycondensation of silanol-containing organosiloxanes.

As shown by U.S. Pat. No. 3,156,668, basic catalysts, such as potassium silanolate, have been used to effect silanol condensation. Although such basic catalysts have been frequently used to effect polycondensation of silanol-containing organosiloxanes (i.e., organosiloxanes having at least one OH group bound directly to silicon), they have been found to be considerably less effective than linear phosphonitrilic chloride (LPNC), described in U.S. Pat. 3,839,388, which requires only a few ppm for rapid gum formation. Even though LPNC type catalysts have been found to be very effective in silanol condensation, experience has shown that these catalysts are also hydrolytically and thermally unstable.

It would be desirable, therefore, to be able to convert silanol-containing organosiloxanes to high molecular weight fluids or gums while avoiding the use of catalysts which are hydrolytically and thermally unstable. It also would be desirable to provide a catalyst for enhancing the rate at which silanol condensation occurs. A suitable silanol condensation rate, for example, would provide an organosiloxane molecular weight build-up within less than 5 minutes at a temperature in the range of 0°–200° C. and a pressure of 0.01–5.0 torr.

STATEMENT OF THE INVENTION

The present invention is based on the discovery that certain strongly hygroscopic, colorless, sterically hindered, non-ionic, crystalline peralkylated phosphazene bases (hereinafter sometimes simply "phosphazene"), which are unusually stable and very soluble in conventional solvents, can be used as highly effective silanol condensation catalysts. Some of these bases and their synthesis are described in Schwesinger et al., *Angew. Chem. Int. Ed.*, 26, 1167–1169 (1987), which is incorporated herein by reference.

There is provided by the present invention a method for effecting polycondensation which comprises contacting, at a temperature in the range of about 0°–200° C. and a pressure up to about 350 torr, a silanol-containing organosiloxane with an amount of a peralkylated phosphazene base which is effective for polycondensation of said organosiloxane.

DETAILED DESCRIPTION; PREFERRED EMBODIMENTS

The reported synthesis of a typical peralkylated phosphazene base, as described in the aforementioned Schwesinger et al. paper, involves the initial formation of an intermediate non-cyclic N-alkyl oligophosphazene by the reaction of $[(R^1)_2N]_3P=NH$ with $Cl_3P=NR^2$, where $R^1$ is a $C_{1-4}$ alkyl radical and $R^2$ is a $C_{1-10}$ alkyl radical, and optionally $(R^1)_2NH$, followed by workup to isolate the fluoborate (i.e., fluoroborate) or perchlorate salts and isolation of the free peralkylated phosphazene by treatment with a strong base.

Some of the phosphazenes which can be used in the practice of the invention have the formula

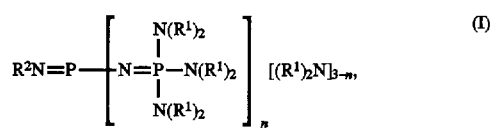

where $R^1$ and $R^2$ are as previously defined and n is 2 or 3. Illustrative phosphazenes include 1-t-butyl-4,4,4-tris-(dimethylamino)-2,2-bis[tris-(dimethylamino)-phosphoranylidenamino]-2$\lambda^5$,4$\lambda^5$-catenadi(phosphazene), the compound wherein $R^1$ is methyl, $R^2$ is t-butyl and n is 3, and 1-t-octyl-4,4,4-tris-(dimethylamino)-2,2-bis[tris(dimethylamino)-phosphoranylidenamino]-2$\lambda^5$, 4$\lambda^5$-catenadi(phosphazene), the compound wherein $R^1$ is methyl, $R^2$ is t-octyl and n is 3. An amount of phosphazene which has been found to be effective as a silanol condensation catalyst is about 20–1000 ppm, preferably about 50–2000 ppm by weight based on organosiloxane.

The expression "silanol-containing organosiloxane" as used in the description of the present invention includes polydiorganosiloxane fluids having the formula, $$HO\text{---}[Si(R^3)_2\text{---}O]_x H \qquad (II)$$

and mixtures thereof with silanol fluids of the formula, $$R^4[(R^3)_2SiO]_y H, \qquad (III)$$

where $R^3$ is a $C_{1-13}$ organic group, $R^4$ is hydrogen or $R^3$ and x and y are integers having a value of about 5–10,000 and preferably about 20–1,000. These fluids can have a viscosity in the range of about 5–500,000 and preferably about 10–30,000 centipoise. The fluids of formula II can be made by hydrolyzing a diorganosilane such as dimethyldichlorosilane in a controlled amount of water in the presence of a suitable acid or base catalyst. The fluids of formula III can be made by equilibrating organosiloxanes comprising a mixture of triorganosiloxy and diorganosiloxy units. The fluids of formula III can contain about 0.02–8% hydroxy radicals attached to silicon. Methods for making the silanol fluids of formulas II and III are disclosed in U.S. Pat. No. 3,541,044, incorporated herein by reference.

In the practice of the invention, a mixture of the silanol-containing organosiloxane and phosphazene is agitated, such as by stirring, under conditions as previously described. While pressures up to about 350 torr have been found effective for the production of silicone oils, it is preferred to employ a pressure of 0.01–100 and still more preferably 0.01–5.0 torr when the production of silicone gums is desired. Although the order of addition of the reactants is not critical, it is preferred to add the phosphazene to the silanol-containing organosiloxane while it is agitated.

Silanol condensation and organosiloxane polymerization can be facilitated by effecting the rapid removal of water of reaction from the reaction mixture. Batch or continuous procedures can be used to provide a variety of silicone products, such as silicone gums, fluids and resins.

The invention is illustrated by the following examples.

EXAMPLE 1

There was added, via syringe, 300 ppm of 1-t-butyl-4,4,4-tris(dimethylamino)-2,2-bis[tris(dimethylamino)-phosphoranylidenamino]-2$\lambda^5$, 4$\lambda^5$-catenadi(phosphazene) obtained from Fluka Chemical Corp., Ronkonkoma, N.Y., in the form of a 0.01M solution in hexane, to a vessel containing 20 g of a silanol-terminated polydimethylsiloxane having a viscosity of 3200 centipoise. The resulting mixture was stirred while it was heated to 90° C. under a vacuum of 1–5 torr. Almost immediately, a large quantity of water was recovered from the mixture. A high viscosity gum was formed in less than 1.5 minutes.

The same procedure was repeated, except that an equivalent amount of tetramethylammonium hydroxide was substituted for the phosphazene as the catalyst. It was found that ten minutes was required for gum formation.

EXAMPLE 2

There was added 200 ppm of the phosphazene employed in Example 1 in the form of a 1M solution in hexane to a stirred mixture at 130° C. which consisted of 397.63 g of a silanol-terminated polydimethylsiloxane having a viscosity of 3200 centipoise and 8.9 ml of a dimethylvinylsiloxy-terminated polydimethylsiloxane having an average of 23 dimethylsiloxy units. Immediately thereafter, the pressure of the mixture was reduced to about 1 torr. After a 10-minute run during which a large quantity of water was generated, the reaction was terminated by adding a solution of 0.06 g of benzoic acid in 3 ml of toluene. There was obtained, dimethylvinylsiloxy-terminated polydimethylsiloxane oil having a viscosity of 15,000 centipoise.

What is claimed is:

1. A method for effecting polycondensation which comprises contacting, at a temperature in the range of about 0°–200° C. and a pressure up to about 350 torr, a silanol-containing organosiloxane with an amount of a peralkylated phosphazene base which is effective for polycondensation of said organosiloxane.

2. A method according to claim 1 where the silanol-terminated organosiloxane is a polydimethylsiloxane.

3. A method according to claim 1 where the peralkylated phosphazene base has the formula

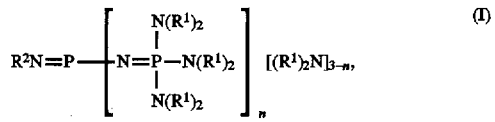

where $R^1$ is a $C_{1-4}$ alkyl radical, $R^2$ is a $C_{1-10}$ alkyl radical and n is 2 or 3.

4. A method according to claim 3 where the peralkylated phosphazene base is 1-t-butyl-4,4,4-tris-(dimethylamino)-2,2-bis[tris-(dimethylamino)-phosphoranylidenamino]-2$\lambda^5$,4$\lambda^5$-catenadi(phosphazene).

5. A method according to claim 3 where the peralkylated phosphazene is 1-t-octyl-4,4,4-tris-(dimethylamino)-2,2-bis[tris(dimethylamino)-phosphoranylidenamino]-2$\lambda^5$,4$\lambda^5$-catenadi(phosphazene).

6. A method according to claim 1 wherein the pressure is in the range of 0.01–100 torr.

7. A method according to claim 1 wherein the pressure is in the range of 0.01–5.0 torr.

* * * * *